(12) United States Patent
Matsui

(10) Patent No.: US 6,194,539 B1
(45) Date of Patent: Feb. 27, 2001

(54) POLYLACTONE HAVING AMINO GROUPS, A PROCESS FOR THE PREPARATION THEREOF, A COMPOUND HAVING AMINO GROUP, A COMPOSITION FOR COATINGS, A COMPOSITION FOR PRINTING INKS

(75) Inventor: Hideki Matsui, Himeji (JP)

(73) Assignee: Daicel Chemical Industries, Inc., Sakai (JP)

( * ) Notice: Subject to any disclaimer, the term of this patent is extended or adjusted under 35 U.S.C. 154(b) by 0 days.

(21) Appl. No.: 08/560,110

(22) Filed: Nov. 17, 1995

(30) Foreign Application Priority Data

Nov. 22, 1994 (JP) .................................................... 6-311302
Nov. 22, 1994 (JP) .................................................... 6-311303

(51) Int. Cl.[7] .................................................... C08G 63/08
(52) U.S. Cl. ............................ 528/354; 528/359; 525/415
(58) Field of Search .................................... 524/192, 186, 524/92; 528/354, 359; 525/415

(56) References Cited

FOREIGN PATENT DOCUMENTS

103988 * 9/1978 (JP) .
174939 * 8/1986 (JP) .
62-218456 * 9/1987 (JP) .

* cited by examiner

Primary Examiner—Terrel Morris
Assistant Examiner—John J. Guarriello
(74) Attorney, Agent, or Firm—Morgan & Finnegan, L.L.P.

(57) ABSTRACT

Disclosed are a novel polylactone having amino groups and to a process for the preparation thereof. The polylactone having amino groups of the present invention is excellent in color hue, and it can be preferably employed in fields such as coatings, inks, ultraviolet ray curable or electronic beam curable resins, etc., in which the color hue becomes a serious problem.

Furthermore, disclosed are a novel compound having amino groups and to a process for the preparation thereof. The compound having amino groups of the present invention can be preferably employed as a dispersant for pigments in a coating composition or a printing ink composition.

5 Claims, No Drawings

POLYLACTONE HAVING AMINO GROUPS, A PROCESS FOR THE PREPARATION THEREOF, A COMPOUND HAVING AMINO GROUP, A COMPOSITION FOR COATINGS, A COMPOSITION FOR PRINTING INKS

FIELD OF THE INVENTION

The present invention relates to a polylactone having amino groups and to a process for the preparation thereof.

The polylactone having amino groups of the present invention can be employed as an emulsified urethane and a dispersant for pigments, etc.

Furthermore, the present invention relates to a process for the preparation of the polylactone having amino groups.

Still further, the present invention relates to a compound having amino groups prepared by the reaction of a polyester compound in which there is included a structural unit having a functional group capable of reacting with amino groups by a Michaels addition reaction at terminal, with a polyamine compound.

In addition, the present invention relates to a dispersant for pigments, a composition for coatings, and a composition for printing inks which essentially contain the compound having amino groups.

BACKGROUND OF THE INVENTION

A large amount of polyurethane resins have been used in a variety of fields such as resins for coatings, adhesives, dispersants for inks, ultraviolet ray curable or electronic beam curable resins, and foams, etc.

Of the urethane resins, as a urethane resin having lactone chains in the main structure has excellent properties as polyurethanes, it has been widely employed.

In the case when the urethane resin having lactone chains is modified as a hydrophilic urethane resin for the purpose of preparing water-based inks or coatings, it has been carried out that amino groups are introduced into the urethane resin.

Also, in the case of intending to improve an anti-strippability of coatings or adhesives from a substrate, and in the case of intending to improve dispersity of inorganic fillers such as magnetic powders in a urethane resin as a binder for magnetic tapes, there has been carried out the introduction of amino groups into the urethane resin.

For example, Japanese Patent Kokai No. 62-218456 discloses that a polycaprolactone having amino groups and urethane resins therefrom can be prepared by the addition reaction of lactone monomers to diamines such as methyliminobisethylene diamine, etc. or to an aminoalcohol such as N-methyldiethanol amine.

It has been conventionally known that lactone monomers can be introduced into hydroxyl group and amino groups by ring-opening addition polymerization, and lactones having amino groups have been prepared by the addition polymerization of lactone monomers to amino alcohol, etc., by heating at 100 to 200° C. in the presence of catalysts.

However, in the case when amines are allowed to thermally react at the above-mentioned reaction conditions, there colors a polycaprolactone having amino groups which is a resulting polymer in a succeeding step, inevitably resulting in that a urethane resin prepared therefrom also colors.

Although it can be prevented to color in preparing the polycaprolactone by the reaction at a temperature below 100° C., reaction period is considerably lengthened, unpreferably resulting in becoming problematic from a viewpoint of commercial production.

The coloration is a serious problem in the case when the polyurethane resin is employed as resins for coatings, inks, ultraviolet ray curable or electronic beam curable resins, etc., and even though excellent properties are obtained in the urethane resins, the colored polylactone having amino groups cannot be substantially employed.

Furthermore, as the polylactone having amino groups derived from a diamine has amide groups, a cohesive force becomes strong. As the result, in the case when lactone chains are short, it unpreferably results in becoming poor in solubility in solvents and compatibility with other resins.

In the meantime, a variety of dispersants have been employed for the purpose of improving dispersity of pigments and storage stability of coatings, reducing a period for dispersing, preventing separation of pigments or dyes, and improving gloss of coated layer or printed surface in the use of coating compositions and inks. Generally speaking, the dispersants to be employed for such the purposes contain functional groups capable of adsorbing pigments and polymer chains composed of polyester or acrylic units having a good compatibility with vehicles for coatings or inks.

There are disclosed a variety of dispersants having amino groups as the functional groups capable of adsorbing pigments.

For example, Japanese Patent Kokai No. 103988/1978 discloses amino compounds having a low molecular weight such as N,N-dimethylaminopropylamine, and Japanese Patent Kokai No. 174939/1986 discloses dispersants for pigments comprising a polyethylene imine which is an amine compound having a high molecular weight. These dispersants for pigments have molecular structures in which polyester chains are combined with polyamines through amide bonds. However, compounds having amide bonds are very strong in cohesive force, as the result, there are problems that the compounds are low in solubility into many solvents for coatings.

Furthermore, nitrogens in the amide bonds do not exhibit adsorption onto pigments because nitrogens in the amide bonds are exceedingly weak in basicity.

For the purpose of improving stability in dispersity by effectively forming a sterically repulsive layer on the surface of pigments, there can be possibly thought an attempt that many amounts of polyester chains are grafted to polyamine chains.

However, grafting of polyester chains results in decreasing the amount of functional groups for adsorbing, unpreferably resulting in causing a problem of decreasing dispersity.

Furthermore, a reaction for grafting polyester chains to polyamine chains requires a temperature ranging from 100 to 150° C. at the lowest in order to attain an appropriate reaction rate.

When starting materials containing amines are heated at the reaction temperature, coloring of a reaction product is almost unavoidable. Accordingly, in light colored coatings, particularly in white colored coatings, it results in becoming problematic.

In view of such the situations, and as a result of extensive investigations, the present inventor has now completed the present invention.

SUMMARY OF THE INVENTION

It is an object of the present invention to provide a polylactone having amino groups which is colorless and excellent in compatibility with other polymers and solubility in solvents, and which can be conveniently employed in a field in which colorless products are required, and it is another object to a process for the preparation thereof.

It is a third object of the present invention to provide a compound having amino groups which can be preferably employed as dispersants for coatings or printing inks.

A first aspect of the present invention relates to a polylactone having amino groups represented by General Formula (1)

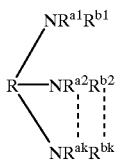

(1)

wherein R is a residual group of an aliphatic, alicyclic, and aromatic hydrocarbon, the atom N may form a ring together with said R which may have a substituent group, at least one of $R^{a1}, R^{a2}, \ldots R^{ak}, R^{b1}, R^{b2}, \ldots R^{bk}$ are a substituent group represented by General Formula (2)

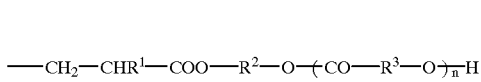

(2)

wherein $R^1$ is a hydrogen or methyl group, $R^2$ is a residual group of an aliphatic or aromatic hydrocarbon having a carbon number ranging from 1 to 10, polypropyleneoxy units or polyethyleneoxy units which may have substituent groups, $R^3$ is an alkylene unit having a carbon number ranging from 3 to 10 which may have side chains having a carbon number ranging from 1 to 5, n pieces of $R^3$ may be identical or different from each other, n is a number ranging from 1 to 100 on an average, and other $R^{a1}, R^{a2}, \ldots R^{ak}, R^{b1}, R^{b2}, \ldots R^{bk}$ are independently a hydrogen or an alkyl group having a carbon number ranging from 1 to 10, k is an integer ranging from 1 to 5.

A second aspect of the present invention relates to a process for the preparation of the polylactone having amino groups which comprises a Michaels addition reaction of a polylactone having (meth)acrylic group represented by General Formula (3)

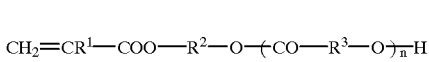

(3)

wherein $R^1$ is a hydrogen or methyl group, $R^2$ is a residual group of an aliphatic, alicyclic, or aromatic hydrocarbon having a carbon number of 1 to 10, polypropyleneoxy units or polyethyleneoxy units which may have substituent groups, $R^3$ is an alkylene unit which may have side chains having a carbon number of 1 to 5, n pieces of $R^3$ may be identical or different from each other, n is a number of 1 to 100 on an average, with an amine having a primary amino group or secondary amino group.

A third aspect of the present invention relates to a compound having amino groups prepared by the reaction of a polyester compound represented by General Formula (4)

(4)

wherein X is a structural unit having a functional group capable of reacting with amino groups by a Michaels addition reaction at terminal, $R^4$ is an alkyl group having a carbon number ranging from 1 to 20, an aromatic group, hydroxyl group, cyano group, and halogen atom, and Y is a structural unit having a polyester chain derived from a lactone compound represented by General Formula (5)

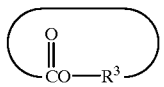

wherein $R^3$ is an alkylene group having a carbon number ranging from 1 to 10 which may be substituted by an aliphatic alkyl group having a carbon number ranging from 1 to 20, with a polyamine compound.

A fourth aspect of the present invention relates to a dispersant for pigments containing the compound having amino groups. A fifth aspect of the present invention relates to a composition for coatings containing the compound having amino groups. A sixth aspect of the present invention relates to a composition for inks containing the compound having amino groups.

DETAILED DESCRIPTION OF THE INVENTION

The present invention will be described hereinafter in more detail.

According to a first aspect of the present invention, there is provided a polylactone having amino groups represented by General Formula (1)

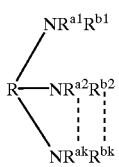

(1)

wherein R is a residual group of an aliphatic, alicyclic, and aromatic hydrocarbon, the atom N may form a ring together with said R which may have a substituent group, at least one of $R^{a1}, R^{a2}, \ldots R^{ak}, R^{b1}, R^{b2}, \ldots R^{bk}$ are a substituent group represented by General Formula (2)

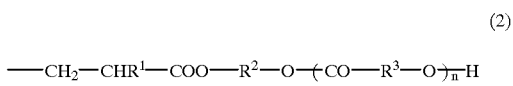

(2)

wherein $R^1$ is a hydrogen or methyl group, $R^2$ is a residual group of an aliphatic or aromatic hydrocarbon having a carbon number ranging from 1 to 10, polypropyleneoxy units or polyethyleneoxy units which may have substituent groups, $R^3$ is an alkylene unit having a carbon number ranging from 3 to 10 which may have side chains having a carbon number ranging from 1 to 5, n pieces of $R^3$ may be identical or different from each other, n is a number ranging from 1 to 100 on an average, and other $R^{a1}, R^{a2}, \ldots R^{ak}, R^{b1}, R^{b2}, \ldots R^{bk}$ are independently a hydrogen or an alkyl group having a carbon number ranging from 1 to 10, k is an integer ranging from 1 to 5.

According to a second aspect of the present invention, there is provided a process for the preparation of the polylactone having amino groups which comprises a Michaels addition reaction of a polylactone having (meth)acrylic group represented by General Formula (3)

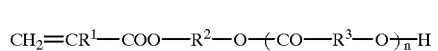
(3)

wherein $R^1$ is a hydrogen or methyl group, $R^2$ is a residual group of an aliphatic, alicyclic, or aromatic hydrocarbon having a carbon number of 1 to 10, polypropyleneoxy units or polyethyleneoxy units which may have substituent groups, $R^3$ is an alkylene unit which may have side chains having a carbon number of 1 to 5, n pieces of $R^3$ may be identical or different from each other, n is a number of 1 to 100 on an average, with an amine having a primary amino group or secondary amino group.

The polylactone having (meth)acrylic group represented by General Formula (3)

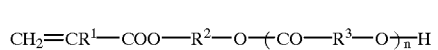
(3)

which is one starting material can be prepared by addition reaction of lactone compounds to a (meth)acrylate having hydroxyl group.

As the (meth)acrylate having hydroxyl group, there can be employed hydroxyethyl(meth)acrylate, hydroxypropyl (meth)acrylate, hydroxybutyl(meth)acrylate, polyethyleneglycol mono(meth)acrylate, polypropyleneglycol mono (meth)acrylate, polyethyleneglycol-propyleneglycol mono (meth)acrylate, polyethyleneglycol-polytetramethyleneglycol mono(meth)acrylate, polypropyleneglycol-polytetramethyleneglycol mono(meth)acrylate (eg. Blemmer PE, Blemmer PP family manufactured by Nihon Yushi, Co. Ltd.)

As the lactone compounds, there can be employed epsilon-caprolactone, delta-valerolactone, beta-methyl-delta-valerolactone, 4-methylcaprolactone, 2-methylcaprolactone, beta-propiolactone, gamma-butyrolactone.

One or more of the lactone compounds may be employed.

In the case when a lactone (meth)acrylate having a high molecular weight is prepared by using only the lactone compound not having side chains, there is obtained a lactone (meth)acrylate which is solid at ordinary temperatures. On the other hand, in the case when a lactone (meth)acrylate having high molecular weight is prepared by using lactone compounds mixed with the lactone compound having side chains, there can be obtained a lactone (meth)acrylate which is liquid-state at ordinary temperatures.

The addition reaction of the lactone compounds can be carried out by charging the (meth)acrylate having hydroxyl group and lactone compounds into a reaction vessel equipped with a condenser, an agitator, a thermometer, and a tube for supplying air or oxygen.

The reaction temperature ranges from 50 to 150° C., preferably from 80 to 120° C. In the case when it is below 50° C., the reaction rate is slow and, contrarily, in the case when it exceeds 150° C., the (meth)acrylate having hydroxyl group unpreferably polymerizes, resulting in being incapable of obtaining a desired product.

The reaction is carried out in the presence of catalysts.

As the catalysts to be employed, there are exemplified a titanium-based catalyst such as tetrabutyl titanate and tetraisopropyl titanate, a tin-based catalyst such as stannous chloride, stannous octylate, and monobutyl tinoxide, an acid-based catalyst such as p-toluenesulfonic acid, etc.

The catalysts are employed in an amount ranging from 0.1 to 3000 ppm, preferably from 1 to 100 ppm. In the case when the amount is below 0.1 ppm, the reaction rate is too slow and, contrarily, in the case when it exceeds 3000 ppm, a resulting product unpreferably colors and becomes unstable.

The reaction is carried out in the presence of polymerization inhibitors in order to prevent polymerization of the (meth)acrylates having hydroxyl group.

As the polymerization inhibitors to be employed, there are exemplified hydroquinone, methylhydroquinone, and phenothiazine, etc. which are conventional polymerization inhibitors.

Furthermore, the reaction is also employed in the presence of a small amount of oxygen as polymerization inhibitors in order to prevent polymerization of the (meth) acrylates having hydroxyl group.

For example, in the case when 1 mol of hydroxyethyl methacrylate and 2 mol of epsilon-caprolactone are employed as starting materials, there is obtained the polylactone having methacrylic group represented by the formula

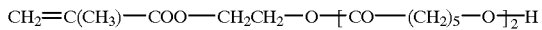

which is known as PCL-FM2 manufactured by Daicel Chemical Industries, Ltd.

Thus-obtained the polylactone having the (meth)acrylic group is allowed to react with amines to obtain the lactone compound having amino groups represented by the above-described General Formula (1) of the present invention.

The amines to be employed essentially includes primary or secondary amino groups, and amines having two functionalities are preferably employed in order to prepare a starting material for polyurethanes.

As such the amines, there are exemplified, for example, ethylenediamine, N,N'-dimethylethylenediamine, piperazine, piperazine derivatives such as 2-methylpiperazine, 2,5-dimethylpiperazine, 2,3-dimethylpiperazine, 1,4-bis(3-aminopropyl)piperazine, N-aminoethylpiperazine, isophoronediamine, polyoxypropylenediamine, bis(4-amino-3-methyldicyclohexyl)methane, diaminodicyclohexylmethane, bis(aminomethyl)cyclohexane, m-xylylenediamine, alpha-(m-aminophenyl)ethylamine, alpha-(p-aminophenyl)ethylamine, metaphenylenediamine, diaminodiphenylmethane, diaminodiphenylsulfone, norbornenediamine, etc., which include conventional aliphatic, alicyclic, and aromatic amines.

Amination reaction is carried out by charging the above-mentioned amines and the lactone-modified (meth)acrylates having hydroxyl group at the same time into a reaction vessel equipped with a tube for removing water, a condenser, and a dropwise funnel, or by charging either the amine or the (meth)acrylate into the reaction vessel and charging the either into the dropwise funnel for adding dropwise.

Amination reaction slightly exothermally, nearly quantitatively, and quickly proceeds even at room temperatures.

As the amination reaction quantitatively proceeds, the amine and the lactone-modified (meth)acrylate having hydroxyl group can be employed in the molar ratio of nearly 1/1. The reaction temperature generally ranges from 10 to 130° C., preferably from 20 to 100° C.

In the case when the temperature is below 10° C., the reaction rate is slow, unpreferably resulting in becoming industrially disadvantageous and, contrarily, in the case when it exceeds 130° C., functional groups capable of reacting by a Michaels addition react each other, unpreferably resulting in causing a problem of coloring in a product.

In the amination reaction, inert solvents can be employed. As examples of the solvents, there can be exemplified aromatic solvents such as xylene, toluene, Solvesso, ketones such as acetone, methylethylketone, methylisobutylketone, alcohols such as butanol and isopropanol, esters such as dimethyladipate, dimethylsuccinate, and dimethylglutarate.

Although the solvents employed in the reaction may be removed by evaporation after the completion of the reaction, the solvents may be employed as components in products.

Thus-obtained polylactone having amino groups of the present invention represented by the above-described General Formula (1) is excellent in color hue, and it can be preferably employed in the fields such as coatings, inks, ultraviolet ray curable or electronic beam curable resins, etc., in which the color hue becomes a serious problem.

For example, polyurethanes prepared from the polylactone having amino groups of the present invention have a more excellent anti-strippability from a substrate and a more excellent dispersibility for pigments than polyurethanes having amino groups prepared from amino alcohols having short chains.

Furthermore, according to the preparation process of the present invention, the polylactone having amino groups which is low in color hue can be prepared by an exceedingly mild condition and short reaction time of period, resulting in being industrially advantageous.

According to a third aspect of the present invention, there is provided a compound having amino groups prepared by the reaction of a polyester compound represented by General Formula (4)

wherein X is a structural unit having a functional group capable of reacting with amino groups by a Michaels addition reaction at terminal, $R^4$ is an alkyl group having a carbon number ranging from 1 to 20, an aromatic group, hydroxyl group, cyano group, and halogen atom, and Y is a structural unit having a polyester chain derived from a lactone compound represented by General Formula (5)

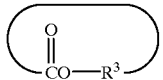

wherein $R^3$ is an alkylene group having a carbon number ranging from 1 to 10 which may be substituted by an aliphatic alkyl group having a carbon number ranging from 1 to 20, with a polyamine compound.

The compound having amino groups of the present invention can be prepared by the reaction of the polyester compound represented by General Formula (4) with a polyamine compound. The polyester compound represented by General Formula (4) can be prepared by a variety of methods as described below.

It is to be noted that the polyester compound represented by General Formula (4) desirably has the functional group capable of reacting with amino groups at only one terminal of the polyester chain. As the functional group capable of reacting with amino groups, (meth)acryloyl group is preferably employed from a viewpoint of industrial manufacturing and reactivity.

The polyester compound having (meth)acryloyl group at only one terminal can be prepared by the following typical three processes; (1) an addition reaction of a lactone compound to a (meth)acrylate having hydroxyl group such as hydroxyethyl(meth)acrylate, (2) a transesterification reaction of a (meth)acrylic ester with a lactone compound, and (3) an addition reaction of a polyester having carboxylic group at one terminal with a (meth)acrylate having epoxy group such as glycidylmethacrylate.

In the addition reaction (1), as the (meth)acrylate having hydroxyl group, there can be employed hydroxyethyl(meth)acrylate, hydroxypropyl(meth)acrylate, and hydroxybutyl(meth)acrylate. In the addition reaction (1), as the lactone compound, there can be employed at least one of lactone compounds represented by General Formula (5) such as epsilon-caprolactone, delta-valerolactone, beta-methyl-delta-valerolactone, 4-methylcaprolactone, 2-methylcaprolactone, beta-propiolactone, and gamma-butyrolactone.

Of those, the lactone compound having side chain such as 4-methylcaprolactone and 2-methylcaprolactone can give an excellent compatibility into resins and an excellent solubility into solvents to the resulting compound having amino group because of capability of putting out of order of crystallinity in polyester chains, preferably resulting in decreasing viscosity and keeping a stability of coatings in low temperatures.

In the addition reaction (1), the (meth)acrylate having hydroxyl group and the lactone compounds are charged into a reaction vessel equipped with a condenser, an agitator, and a tube for supplying air or oxygen, and then heated. Reaction temperature ranges from 50 to 150° C., and preferably from 80 to 120° C. In the case when the temperature is below 50° C., the reaction rate is slow and, contrarily, in the case when the temperature exceeds 150° C., the (meth)acrylate having hydroxyl group polymerizes, unpreferably resulting in incapability of preparing a desired product.

As catalysts in the addition reaction (1), there can be employed a titanium-based catalyst such as tetrabutyl titanate and tetraisopropyl titanate, tin-based catalyst such as stannous chloride, stannous octylate and monobutyltin oxide, and acids such as p-toluene sulfonic acid, and the like.

The catalyst can be employed in an amount ranging from 0.1 to 3,000 ppm, and preferably from 1 to 100 ppm. In the case when the amount is below 0.1 ppm, the reaction rate is slow and, contrarily, in the case when the amount exceeds 3,000 ppm, the polyester compound considerably colors and the excessive amount of catalyst to be employed adversely affects a stability in a product such as a coating composition.

In the addition reaction (1), a polymerization inhibitor is preferably employed in order to prevent polymerization of the (meth)acrylate having hydroxyl group.

As the polymerization inhibitor, there can be employed hydroquinone, methylhydroquinone, and phenothiazine which are conventional polymerization inhibitors. Furthermore, the addition reaction can be preferably carried out in the presence of an appropriate amount of oxygen in order to prevent polymerization of the (meth)acrylate having hydroxyl group.

In the transesterification reaction (2), as the (meth)acrylic ester, there can be employed methyl(meth)acrylate, ethyl (meth)acrylate, butyl(meth)acrylate, and octyl(meth) acrylate.

As the lactone compound, there can be employed at least one of lactone compounds represented by General Formula (5) such as epsilon-caprolactone, delta-valerolactone, beta-methyl-delta-valerolactone, 4-methylcaprolactone, 2-methylcaprolactone, beta-propiolactone, and gamma-butyrolactone.

Of those, the lactone compound having side chains such as 4-methylcaprolactone and 2-methylcaprolactone can give an excellent compatibility into resins and an excellent solubility into solvents to the resulting compound having amino group because of capability of putting out of order of crystallinity in polyester chains, preferably resulting in decreasing viscosity and keeping a stability of coatings in low temperatures.

Even in the case when the polyester compound cannot be liquified at ordinary temperatures by the use of only the lactone compound not having side chains, it can be liquified by copolymerizing with the lactone compound having side chains.

Also in the transesterification reaction (2), the (meth) acrylate and the lactone compounds are charged into a reaction vessel equipped with a condenser, agitator, and a tube for supplying air or oxygen, and then heated. Reaction temperature ranges from 50 to 150° C., and preferably from 80 to 120° C. In the case when the temperature is below 50° C., the reaction rate is slow and, contrarily, in the case when the temperature exceeds 150° C., the (meth)acrylate polymerizes, unpreferably resulting in incapability of preparing a desired product.

As catalysts in the transesterification reaction (2), there can be employed a titanium-based catalyst such as tetrabutyl titanate and tetraisopropyl titanate, tin-based catalyst such as stannous chloride, stannous octylate and monobutyltin oxide, and acids such as p-toluene sulfonic acid, and the like.

The catalyst can be employed in an amount ranging from 0.1 to 1%, and preferably from 1 to 1000 ppm. In the case when the amount is below 0.1 ppm, the reaction rate is slow and, contrarily, in the case when the amount exceeds 1%, the polyester compound considerably colors and the excessive amount of catalyst to be employed adversely affects a stability in a product such as a coating composition.

Also in the transesterification reaction (2), a polymerization inhibitor is preferably employed in order to prevent polymerization of the (meth)acrylate.

As polymerization inhibitor, there can be employed hydroquinone, methylhydroquinone, and phenothiazine which are conventional polymerization inhibitors. Furthermore, the transesterification reaction (2) can be preferably carried out in the presence of an appropriate amount of oxygen in order to prevent polymerization of the (meth) acrylate.

A polyester having carboxylic group at one terminal in the addition reaction (3) can be prepared by an addition reaction of lactone compounds to a monocarboxylic acid or by an addition reaction of lactone compounds to a carboxylic acid having hydroxyl group.

As the monocarboxylic acid in the addition reaction (3), there can be employed at least one of aliphatic or aromatic carboxylic acids such as acetic acid, propionic acid, butylic acid, valeric acid, trimethyl acetic acid, caproic acid, lauryl acid, stearic acid, phenyl acetic acid, methoxy acetic acid, and the like.

As the lactone compound, there can be employed at least one of lactone compounds represented by General Formula (5) such as epsilon-caprolactone, delta-valerolactone, beta-methyl-delta-valerolactone, 4-methylcaprolactone, 2-methylcaprolactone, beta-propiolactone, and gamma-butyrolactone.

Of those, the lactone compound having side chains can give an excellent compatibility into resins and an excellent solubility into solvents to the resulting compound having amino group because of capability of putting out of order of crystallinity in polyester chains, preferably resulting in decreasing viscosity and keeping a stability of coatings in low temperatures.

As the carboxylic acid having hydroxyl group, there can be employed ricinoleic acid, 12-hydroxystearic acid, castor oil acid, hydrogenated castor oil acid, delta-hydroxyvaleric acid, epsilon-hydroxy caproic acid, p-hydroxyethyloxycarboxylic acid, 2-hydroxynaphthalene-6-carboxylic acid, 2,2-dimethylolpropionic acid, 2,2-dimethylolvaleric acid, 2,2-dimethylolpentanic acid, malic acid, tartaric acid, lactic acid, glycolic acid, glucolic acid, hydroxypyvaric acid, 11-oxyhexadecanoic acid, 2-oxydodecanoic acid, and salicylic acid, and the like.

As the polyester carboxylic group at one terminal in the addition reaction (3), there can be also employed a polyester compound prepared by esterification or transesterification reaction between n mol of a dicarboxylic acid or anhydride thereof and n mol of a diol, and the lactone compounds as described hereinabove.

As the dicarboxylic acid or anhydride thereof, there can be employed maleic acid, succinic acid, glutaric acid, fumaric acid, adipic acid, sebasic acid, azelaic acid, dodecanoic acid, phthalic acid, isophthalic acid, terephthalic acid, hexahydrophthalic acid, methylhexahydrophthalic acid, tetrahydrophthalic acid, trimellitic acid, methyltetrahydrophthalic acid, and anhydrides thereof, and the like.

As the diols, there can be employed aliphatic alcohols having or not having side chains, alicyclic alcohols, and aromatic alcohols such as ethyleneglycol, diethyleneglycol, diethyleneglycol, 1,2-propyleneglycol, 1,3-propyleneglycol, 1,3-butyleneglycol, 1,4-butyleneglycol, neopentylglycol, 3-methylpentanediol, 1,5-pentanediol, 1,6-hexanediol, trimethylolpropane, cyclohexane dimethanol, and 1,4-dibenzylalcohol, and the like. Furthermore, there can be also employed a monoepoxide of an alpha-olefine, and the like.

The polyester carboxylic group at one terminal can be prepared in a reaction vessel equipped with a condenser, an agitator, and a tube for removing water while streaming nitrogen. In the reaction, there may be also employed appropriate solvents for removing water such as toluene and xylene. The solvents to be employed in the reaction may be removed by distillation, etc. after the completion of the reaction, or may be remained as components in products without removing.

The reaction temperature ranges from 120 to 220° C., and preferably from 160 to 210° C. In the case when the reaction temperature is below 120° C., the reaction rate is exceedingly slow and, contrarily, in the case when the temperature exceeds 210° C., there readily occur side reactions other than the addition reaction of lactone compounds such as decomposition of the lactone monomers and production of cyclic lactone dimer, etc., unpreferably resulting in being difficult in preparing a polyester having carboxylic group at one terminal which has a desired molecular weight. Furthermore, the resulting polyester readily colors.

In the addition reaction (1), catalysts can be employed.

As the catalysts, there can be employed an organic tin-based catalyst such as tinoctylate, dibutyltinoxide, dibutyltinlaurate, monobutyltin hydroxybutyloxide, a tin-based catalyst such as stannous oxide and stannous chloride, a titanium-based catalyst such as tetrabutyl titanate, tetraethyl titanate, and tetrapropyl titanate, and the like.

The catalysts can be employed in an amount ranging from 0.1 to 3000 ppm, and preferably from 1 to 100 ppm. In the case when the amount exceeds 3000 ppm, the polyester compound considerably colors and the excessive amount of catalyst employed adversely affects a stability in a product such as a coating composition and, contrarily, in the case when the amount is below 0.1 ppm, the reaction rate is exceedingly slow.

Thus-obtained polyester carboxylic group at one terminal are allowed to react with a (meth)acrylate having epoxy group to obtain the polyester compound having a functional group capable of reacting with amino groups by a Michaels addition reaction which is represented by General Formula (4).

As the (meth)acrylate having epoxy group, there are preferably employed glycidylmethacrylate, beta-methylglycidylmethacrylate, and 2,3-epoxycyclohexylmethyl(meth)acrylate.

As the (meth)acrylate having epoxy group and the polyester carboxylic group at one terminal are charged into a reaction vessel equipped with a condenser, an agitator, and a tube for supplying air or oxygen, and then heated.

The reaction temperature ranges from 50 to 150° C., and preferably from 80 to 120° C. In the case when the reaction temperature is below 50° C., the reaction rate is exceedingly slow and, contrarily, in the case when the temperature exceeds 150° C., there readily occur polymerization of the (meth)acrylate having epoxy group, unpreferably resulting in incapability of obtaining a desired polyester compound having a functional group capable of reacting with amino groups by a Michaels addition reaction. In the reaction, catalysts are employed.

As the catalysts, there are exemplified, for example, amine-based catalysts such as N,N'-dimethylbenzylamine, 2-(dimethylaminomethyl)phenol, 2,4,6-tris (dimethylaminomethyl)phenol, phosphorus-based catalysts such as triphenylphosphine, tetraphenylphosphonium, and ethyltriphenylphosphonium, etc.

The catalysts can be employed in an amount ranging from 0.1 to 3000 ppm, and preferably from 1 to 500 ppm. In the case when the amount exceeds 3000 ppm, the polyester compound considerably colors and the excessive amount of the catalyst to be employed adversely affects a stability in a product such as a coating composition and, contrarily, in the case when the amount is below 0.1 ppm, the reaction rate is exceedingly slow.

The reaction are preferably carried out in the presence of polymerization inhibitors in order to prevent polymerization of (meth)acrylic group in the (meth)acrylate having epoxy group. As the polymerization inhibitors to be employed, there are exemplified hydroquinone, methylhydroquinone, and phenothiazine, etc. which are conventional polymerization inhibitors.

Furthermore, the reaction is preferably employed in the presence of a small amount of oxygen which is an another polymerization inhibitor in order to prevent polymerization of (meth)acrylic group in the (meth)acrylates having epoxy group.

In addition to the processes (1) to (3) for the preparation of the polyester carboxylic group at one terminal, there can be also employed a process in which a monofunctional polyester having one hydroxyl group is prepared and then it is allowed to react with a bifunctional isocyanate to prepare a prepolymer, and further the prepolymer is allowed to react with the (meth)acrylates having epoxy group.

However, in the case of the process, there is readily by-produced a polyester prepared by the reaction of 2 mol of the monofunctional polyester having one hydroxyl group with 1 mol of the bifunctional isocyanate. Furthermore, in the case when the unreacted isocyanate is remained, unpreferred crosslinking reactions are caused, as the result, gelation is unpreferably caused in a succeeding reaction process with a polyamine compound as described hereinafter.

Thus-obtained polyester compound which has a functional group capable of reacting with amino groups by a Michaels addition reaction at terminal represented by General Formula (4) has a molecular weight ranging from 100 to 20,000, preferably from 300 to 10,000, and more preferably from 500 to 5,000 on an average.

In the case when the molecular weight is below 100, a resulting compound having amino group in a succeeding reaction process with a polyamine compound cannot sufficiently form a sterically repulsive layer around pigments and, contrarily, in the case when the molecular weight exceeds 20,000, molecular weight in a resulting compound having amino group becomes excessively larger, unpreferably resulting in that there decreases compatibility with a composition for coatings or inks and there also lowers dispersity of pigments.

A compound having amino groups can be prepared by the reaction of thus-obtained polyester compound having a functional group capable of reacting with amino groups by a Michaels addition reaction at terminal represented by General Formula (4) with a polyamine compound in a succeeding step.

The polyamine to be employed in the succeeding step desirably has a molecular weight ranging from 200 to 100,000.

In the case when the molecular weight is below 200, there becomes excessively low a molecular weight of an adsorptive portion in the compound having amino group, unpreferably resulting in that the use of the polyamine compound is not effective.

Contrarily, in the case when the molecular weight exceeds 100,000, molecular weight of the compound having amino groups becomes excessively larger, unpreferably resulting in that the compound having amino groups tends to associate each other and there also tends to lower the dispersity of pigments. Furthermore, there becomes unpreferably higher a melting viscosity of the compound having amino groups, unpreferably resulting in a difficulty of the preparation.

Specific examples of the polyamine to be employed include a polyethylene imine which can be prepared by a ring-opening polymerization of ethyleneimine, a polyallyl amine which can be prepared by a polymerization of allylamine, and a polyvinyl amine which can be prepared by a polymerization of vinylamine.

Furthermore, there can be also employed reaction products with a monoepoxide of an alpha-olefine, a monoepoxide of Kardula E (manufactured by Nihon Yushi Co. Ltd.), etc., a polyamine compound modified by an acrylic monomer such as methyl(meth)acrylate, butyl(meth)acrylate, hydroxyethyl(meth)acrylate, and cyclohexyl(meth)acrylate.

The polyester compound having a functional group capable of reacting with amino groups by a Michaels addition reaction at terminal is allowed to react with the polyamine compound in a ratio ranging from 1/1 to 1/99, preferably from 2/3 to 1/65 based on the molar ratio of the functional group to amino group. In the case when it exceeds 1/1, the functional group remains, unpreferably resulting in that a stability in a composition becomes poor and, contrarily, in the case when it is below 1/99, the use of the polyamine becomes meaningless.

The polyester compound having a functional group capable of reacting with amino groups and the polyamine compound are allowed to react in a reaction vessel equipped with a condenser, an agitator, and a tube for removing water.

The reaction quantitatively and quickly proceeds as a slight exothermal reaction even at room temperatures.

Accordingly, the reaction temperature ranges from 10 to 130° C., and preferably from 20 to 100° C. In the case when the temperature is below 10° C., the reaction rate is slow, unpreferably resulting in incapability of industrially manufacturing and, contrarily, in the case when it exceeds 130° C., the functional groups capable of reacting with amino groups by a Michaels addition reaction react each other, and there unpreferably occurs a problem that a reaction product colors.

In the reaction, there can be also employed inert solvents not affecting the addition reaction. As examples of the solvents, there can be employed aromatic solvents such as xylene, toluene, Solvesso, ketones such as acetone, methylethylketone, methylisobutylketone, alcohols such as butanol and isopropanol, esters such as dimethyladipate, dimethylsuccinate, and dimethylglutarate.

Although the solvents employed in the reaction can be removed by evaporation after the completion of the reaction, the solvents can be employed as components in products.

Thus-obtained polyester compound which has a functional group capable of reacting with amino groups by a Michaels addition reaction at terminal represented by General Formula (4) also has a molecular weight ranging from 100 to 20,000, preferably from 300 to 10,000, and more preferably from 500 to 5,000 on an average.

In the case when the molecular weight is below 100, a resulting compound having amino groups in a succeeding reaction process with a polyamine compound cannot sufficiently form a sterically repulsive layer around pigments and, contrarily, in the case when the molecular weight exceeds 20,000, molecular weight in a resulting compound having amino groups becomes excessively larger, resulting in that there decreases compatibility with a composition for coatings or inks and there also lowers dispersity of pigments.

In thus-obtained compound having amino groups of the present invention, in the case when the opposite terminal to the amino group in the polyester chain is terminated by hydroxyl group, the compound having amino group of the present invention is firmly incorporated into coated layer by the reaction with melamine resins or diisocyanate compounds in a baking process of coatings. Accordingly, the compound having amino groups in the coated layer does not bleed out and does not crystallize, preferably resulting in that pigments grasped by the compound having amino groups do not bleed out of the coating layer and do not tend to readily aggregate.

Furthermore, the use of a lactone-contained polyester compound having a reasonable molecular weight enables to employ a relatively polar solvent such as alcohols or cellosolves for dispersing pigments.

The compound having amino groups of the present invention has an excellent dispersity for inorganic pigments such as titanium oxide, zinc oxide, cadmium sulfide, yellow iron oxide, red iron oxide, chrome yellow, carbon black, organic pigments such as phthalocyanine, insoluble azo-based dyes, azolake pigments, condensed polycyclic-based pigments (a durene-based, an indigo-based, a perylene-based, a perinone-based, a phthalone-based, a dioxadine-based, a quinacridone-based, an isoindolinone-based, and a diketopyrrolopyrole-based pigment).

Furthermore, a millbase composition containing the compound having amino groups of the present invention is excellent in fluidity and storage stability.

For inorganic pigments, there may be generally employed a small amount of the compound having amino groups, specifically, the ratio of ranging from 1/20 to 1/200, preferably from 1/50 to 1/100. For organic pigments, there may be generally employed a relatively larger amount of the compound having amino groups, specifically, the ratio ranging from 1/1 to 1/50, preferably from 1/2 to 1/10.

In the case when the compound having amino groups is excessively employed, properties of coating layer decrease and, contrarily, in the case when the pigments are excessively less employed, a dispersing time of period becomes lengthened, and a stability in a composition becomes poor.

In the following, although the present invention is specifically illustrated below by Examples, it is not limited by the Examples. It is to be noted that the terminology "part" and "%" are based on the weight.

EXAMPLE 1

Preparation No. 1 of a Polylactone Having Amino Groups Represented by General Formula (1)

A 2-liter glass-made reaction flask equipped with an agitator, a Dimroth condenser, a thermometer, a tube for blowing air was charged with 232 parts of hydroxyethylacrylate (HEA), 684 parts of epsilon-caprolactone, 0.009 part of stannous chloride, 1 part of methylhydroquinone, followed by heating at 100° C. to allow to react until epsilon-caprolactone monomer decreases to less than 1% to obtain a lactone-modified hydroxyethylacrylate. Successively, the temperature was lowered to 50° C., and then 86 parts of piperazine was added while stirring to allow to react.

The reaction was terminated by monitoring with an $^1$H-NMR analyzer that acrylic group disappeared to obtain a polylactone having amino groups.

Delta value (ppm) in $^1$H-NMR 1.3–1.5: multiplet by methylene proton in polycaprolac tone (12H)

1.5–1.8: multiplet by methylene proton in polycaprolac tone (24H)

2.2–2.4: multiplet by methylene proton in polycaprolac tone (12H)

2.4–2.6: multiplet by methylene proton in piperazine, —CH$_2$—CO— (12H)

2.7: triplet by methylene proton in —N—CH$_2$CH$_2$—CO— (4H)

3.6: triplet by methylene proton in polycaprolactone (—CH$_2$—OH) (4H)

3.75: triplet by methylene proton of the bonded OH in HEA added to piperazine 4.05: triplet by methylene proton in polycaprolactone (—CH$_2$—OCO—) (12H)

4.3: singlet by methylene proton in —COOCH$_2$CH$_2$—O— (8H)

It was identified by the assignment of the delta values in the $^1$H-NMR analysis that the polylactone has the chemical formula represented by General Formula (1) as described below;

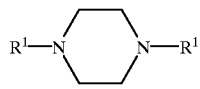

wherein R$^1$ is —CH$_2$CH$_2$—COOCH$_2$CH$_2$O—[—CO(CH$_2$)$_5$—O—]$_2$—CO(CH$_2$)$_5$—OH.

Furthermore, it was identified that the polylactone having amino groups which is a liquid exhibits a hydroxyl value of 112 mgKOH/g and APHA value (color hue) of 80.

EXAMPLE 2

Preparation No. 2 of a Polylactone Having Amino Groups Represented by General Formula (1)

The same procedures were followed as in Example 1, except that there were employed 288 parts of hydroxybutylacrylate (HBA), 1140 parts of epsilon-caprolactone, and 0.01 part of monobutyltin oxide. The reaction was terminated by monitoring with an ¹H-NMR analyzer that acrylic group disappeared to obtain a polylactone having amino groups.

Delta value (ppm) in ¹H-NMR 1.3–1.5: multiplet by methylene proton in polycaprolactone (10H)

1.5–1.8: multiplet by methylene proton in polycaprolactone (48H)

2.2–2.4: multiplet by methylene proton in polycaprolactone (20H)

2.4–2.6: multiplet by methylene proton in piperazine, —CH$_2$—CO— (20H)

2.7: triplet by methylene proton in —N—CH$_2$CH$_2$—CO— (4H)

3.6: triplet by methylene proton in polycaprolactone (—CH$_2$—OH) (4H)

3.75: triplet by methylene proton of the bonded OH in HBA added to piperazine 4.05: triplet by methylene proton in polycaprolactone (—CH$_2$—OCO—) (8H)

4.3: triplet by methylene proton in —COOCH$_2$CH$_2$CH$_2$CH$_2$—O— (8H)

It was identified by the assignment of the delta values in the ¹H-NMR analysis that the polylactone having amino groups exhibits the chemical formula represented by General Formula (1) as described below;

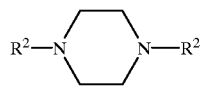

wherein R² is

—CH$_2$CH$_2$—COOCH$_2$CH$_2$CH$_2$CH$_2$O—[—CO(CH$_2$)$_5$—O—]$_4$—CO(CH$_2$)$_5$—OH.

Furthermore, it was identified that the polylactone having amino groups which is a viscous liquid has a hydroxyl value of 75 mgKOH/g and APHA value (color hue) of 110.

EXAMPLE 3

Preparation No. 3 of a Polylactone Having Amino Groups Represented by General Formula (1)

The same procedures were followed as in Example 1, except that there were employed 232 parts of hydroxyethylacrylate (HEA), 684 parts of epsilon-caprolactone, 0.02 part of stannous chloride, 2 part of methylhydroquinone, and 100 parts of 2-methylpiperazine. The reaction was terminated by monitoring with an ¹H-NMR analyzer that acrylic group disappeared to obtain a polylactone having amino groups.

Delta value (ppm) in ¹H-NMR 1.0–1.2: doublet by methylene proton in piperazine (3H)

1.3–1.5: multiplet by methylene proton in polycaprolactone (12H)

1.5–1.8: multiplet by methylene proton in polycaprolactone (24H)

2.2–2.4: multiplet by methylene proton in polycaprolactone (12H)

2.4–2.6: multiplet by methylene proton in piperazine, —CH$_2$—CO— (11H)

2.7: triplet by methylene proton in —N—CH$_2$CH$_2$—CO— (4H)

3.6: triplet by methylene proton in polycaprolactone (4H)

3.75: triplet by methylene proton of the bonded OH in HEA added to piperazine 4.05: triplet by methylene proton in polycaprolactone (—CH$_2$—OCO—) (8H)

4.3: triplet by methylene proton in —COOCH$_2$CH$_2$—O— (8H)

It was identified by the assignment of the delta values in the ¹H-NMR analysis that the polylactone having amino groups exhibits the chemical formula represented by General Formula (1) as described below;

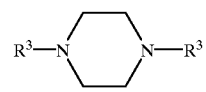

wherein R³ is —CH$_2$CH$_2$—COOCH$_2$CH$_2$O—[—CO(CH$_2$)$_5$—O—]$_2$—CO(CH$_2$)$_5$—OH.

Furthermore, it was identified that the polylactone having amino groups which is a highly viscous liquid has a hydroxyl value of 109 mgKOH/g and APHA value (color hue) of 90.

EXAMPLE 4

Preparation No. 4 of a Polylactone Having Amino Groups Represented by General Formula (1)

A 5-liter glass-made reaction flask equipped with an agitator, a Dimroth condenser, a thermometer, a tube for blowing air was charged with 232 parts of hydroxyethylacrylate (HEA), 1140 parts of epsilon-caprolactone, 0.02 part of stannous chloride, 2 part of methylhydroquinone, followed by heating at 100° C. to allow to react until

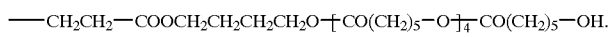

epsilon-caprolactone decreases to less than 1% to obtain a lactone-modified hydroxyethylacrylate. Successively, the temperature was lowered to 50° C., and then 88 parts of N,N'-dimethylethylenediamine (CH$_3$—NH—CH$_2$CH$_2$—NHCH$_3$) was added while stirring. The reaction was terminated by monitoring with an ¹H-NMR analyzer that acrylic group disappeared to obtain a polylactone having amino groups.

Delta value (ppm) in ¹H-NMR 1.3–1.5: multiplet by methylene proton in polycaprolactone (20H)

1.5–1.8: multiplet by methylene proton in polycaprolactone (40H)

2.2–2.4: multiplet by methylene proton in polycaprolactone (20H)

2.4–2.6: multiplet by methylene proton in —N—CH$_2$—, —CO—CH$_2$— (6H)

2.7: triplet by methylene proton in —N—CH$_2$CH$_2$—CO— (4H)

3.6: triplet by methylene proton of —CH$_2$—OH in polycaprolactone (4H)

3.75: triplet by methylene proton of the bonded OH in HEA added to N,N'-dimethylethylenediamine 4.05: triplet by methylene proton of —CH$_2$—OCO— in polycaprolactone (12H)

4.3: singlet by methylene proton in —CO—OCH$_2$CH$_2$—O— (8H)

1.8–2.0: singlet by methylene proton in —N—CH$_3$ (6H)

It was identified by the assignment of the delta values in the $^1$H-NMR analysis that the polylactone having amino groups exhibits the chemical formula represented by General Formula (1) as described below;

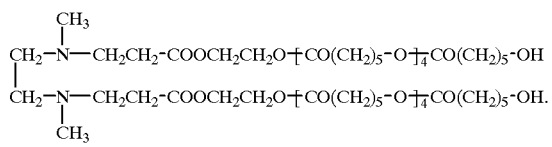

Furthermore, it was identified that the polylactone having amino groups which is a highly viscous liquid has a hydroxyl value of 77 mgKOH/g and APHA value (color hue) of 130.

EXAMPLE 5

Preparation No. 5 of a Polylactone Having Amino Groups Represented by General Formula (1)

The same procedures were followed as in Example 1, except that there were employed 1140 parts of epsilon-caprolactone, 0.02 part of stannous chloride, and 2 parts of methylhydroquinone to obtain a lactone-modified hydroxyethylacrylate.

Successively, the temperature was lowered to 50° C., and then 200 parts of 1,4-bis(3-aminopropyl)piperazine was added while stirring. The reaction was terminated by monitoring with an $^1$H-NMR analyzer that acrylic group disappeared to obtain a polylactone having amino groups.

Delta value (ppm) in $^1$H-NMR 2.2–2.8: multiplet by methylene proton in —N—CH$_2$— (20H)

1.5–1.8: multiplet by methylene proton in N—CH$_2$CH$_2$CH$_2$—N (4H)

2.4–2.6: multiplet by methylene proton in —N—CH$_2$CH$_2$COO (4H)

4.3: singlet by methylene proton in —CO—O—CH$_2$CH$_2$—O— (8H)

1.3–1.5: multiplet by methylene proton in polycaprolactone (20H)

1.5–1.8: multiplet by methylene proton in polycaprolactone (40H)

2.2–2.4: multiplet by methylene proton in polycaprolactone (20H)

3.6: multiplet by methylene proton in —CH$_2$OH (4H)

It was identified by the assignment of the delta values in the $^1$H-NMR analysis that the polylactone having amino groups exhibits the chemical formula represented by General Formula (1) as described below;

wherein R$^5$ is

Furthermore, it was identified that the polylactone having amino groups which is a viscous liquid has APHA value (color hue) of 120.

COMPARATIVE EXAMPLE 1

Preparation No. 6 of a Polylactone Having Amino Groups

A 2-liter glass-made reaction flask equipped with an agitator, a Dimroth condenser, a thermometer, and a tube for blowing air was charged with 1140 parts of epsilon-caprolactone, 0.02 part of stannous chloride, and 200 parts of 1,4-bis(3-aminopropyl)piperazine, followed by heating at 150° C. to allow to react until epsilon-caprolactone decreases to less than 1% to obtain a waxy brown-colored polylactone having APHA of more than 500.

COMPARATIVE EXAMPLE 2

Preparation No. 7 of a Polylactone Having Amino Groups

The same procedures were followed as in Comparative Example 1, except that there was employed 119 parts of N-methyldiethanolamine to obtain a brown-colored polylactone having amino groups having APHA of more than 500 which is a brown-colored high viscous liquid.

PREPARATION EXAMPLE 1

Preparation No. 1 of a Polyester Compound Represented by General Formula (4)

A 2-liter glass-made reaction flask equipped with an agitator, a Dimroth condenser, a thermometer, and a tube for blowing air was charged with 116 parts of hydroxyethylacrylate, 1140 parts of epsilon-caprolactone, 0.012 part of monobutyltin oxide, and 1.3 part of methylhydroquinone, followed by heating at 100° C. for 10 hours to allow to react until epsilon-caprolactone decreases to less than 1% to obtain a polyester compound represented by General Formula (4).

The polyester compound is designated as PE-1.

PREPARATION EXAMPLE 2

Preparation No. 2 of a Polyester Compound Represented by General Formula (4)

The same procedures were followed as in Preparation Example 1, except that 1710 parts of epsilon-caprolactone, 0.018 part of monobutyltin oxide, and 1.8 part of methylhydroquinone were employed to obtain a polyester compound represented by General Formula (4).

The polyester compound is designated as PE-2.

PREPARATION EXAMPLE 3

Preparation No. 3 of a Polyester Compound Represented by General Formula (4)

The same procedures were followed as in Preparation Example 1, except that 3-liter glass-made reaction flask 2280 parts of epsilon-caprolactone, 0.025 part of monobutyltin oxide, and 2.5 part of methylhydroquinone were employed to obtain a polyester compound represented by General Formula (4). The polyester compound is designated as PE-3.

PREPARATION EXAMPLE 4

Preparation No. 4 of a Polyester Compound Represented by General Formula (4)

The same procedures were followed as in Preparation Example 1, except that 3-liter glass-made reaction flask, 130 parts of hydroxyethylacrylate, 1710 parts of epsilon-caprolactone, 0.020 part of monobutyltin oxide, and 2.0 part of methylhydroquinone were employed to obtain a polyester compound represented by General Formula (4). The polyester compound is designated as PE-4.

PREPARATION EXAMPLE 5

Preparation No. 5 of a Polyester Compound Represented by General Formula (4)

The same procedures were followed as in Preparation Example 1, except that 3-liter glass-made reaction flask, 1400 parts of epsilon-caprolactone, 600 parts of 4-methylcaprolactone, 0.021 part of monobutyltin oxide, and 2.1 part of methylhydroquinone to obtain a polyester compound represented by General Formula (4). The polyester compound is designated as PE-5.

PREPARATION EXAMPLE 6

Preparation No. 6 of a Polyester Compound Represented by General Formula (4)

The same procedures were followed as in Preparation Example 1, except that 3-liter glass-made reaction flask, 1600 parts of epsilon-caprolactone, 400 parts of 4-methylcaprolactone, 0.021 part of monobutyltin oxide, and 2.1 part of methylhydroquinone to obtain a polyester compound represented by General Formula (4). The polyester compound is designated as PE-6.

PREPARATION EXAMPLE 7

Preparation No. 7 of a Polyester Compound Represented by General Formula (4)

A 3-liter glass-made reaction flask equipped with an agitator, a Dimroth condenser, a thermometer, and a tube for blowing air was charged with 116 parts of caproic acid, 1400 parts of epsilon-caprolactone, 600 parts of 12-hydroxystearic acid, and 0.05 part of tetrabutyl titanate, followed by heating at 190° C. for 14 hours to allow to react to obtain a polyester compound represented by General Formula (4) which is a viscous liquid having an acid value of 28 mgKOH/g. Successively, the polyester compound was cooled to 80° C., and 1 part of triphenylphosphine as a catalyst was dissolved, and then 142 parts of glycidylmethacrylate was added dropwise to allow to react until the acid value changes to 1 mgKOH/g.

The glycidylmethacrylate-modified polyester compound is designated as PE-7.

EXAMPLE 6

Preparation No. 1 of a Compound Having Amino Groups

A 2-liter glass-made reaction flask equipped with an agitator, a Dimroth condenser, a thermometer, and a tube for blowing air was charged with 900 parts of PE-1, followed by heating at 60° C. Successively, there was charged 100 parts of a polyethyleneimine having a molecular weight of 10,000 (SP200, manufactured by Nihon Shokubai Kagaku Co. Ltd.) to allow to react while stirring. Reaction was terminated after monitoring that acrylic groups disappeared with a proton NMR analyzer.

Reaction product was a waxy solid having an amino value of 102 mgKOH/g and an APHA value of 130 in a melting state.

The waxy solid was designated as CAG-1.

EXAMPLE 7

Preparation No. 2 of a Compound Having Amino Groups

The same procedures were followed as in Example 6, except that 950 parts of PE-1 and 50 parts of SP200 were employed to obtain a waxy solid having an amino value of 55 mgKOH/g and an APHA value of 120 in a melting state. The waxy solid was designated as CAG-2.

EXAMPLE 8

Preparation No. 3 of a Compound Having Amino Groups

The same procedures were followed as in Example 6, except that 900 parts of PE-2 and 100 parts of SP200 were employed to obtain a waxy solid having an amino value of 105 mgKOH/g and an APHA value of 130 in a melting state. The waxy solid was designated as CAG-3.

EXAMPLE 9

Preparation No. 4 of a Compound Having Amino Groups

The same procedures were followed as in Example 6, except that 950 parts of PE-2 and 50 parts of SP200 were employed to obtain a waxy solid having an amino value of 54 mgKOH/g and an APHA value of 120 in a melting state. The waxy solid was designated as CAG-4.

EXAMPLE 10

Preparation No. 5 of a Compound Having Amino Groups

The same procedures were followed as in Example 6, except that 950 parts of PE-3 and 50 parts of SP200 were employed to obtain a waxy solid having an amino value of 55 mgKOH/g and an APHA value of 190 in a melting state. The waxy solid was designated as CAG-5.

EXAMPLE 11

Preparation No. 6 of a Compound Having Amino Groups

The same procedures were followed as in Example 6, except that 900 parts of PE-2 and 100 parts of a polyethyleneimine having a molecular weight of 1,800 (SP018, manufactured by Nihon Shokubai Kagaku Co. Ltd.) were employed to obtain a waxy solid having an amino value of 104 mgKOH/g and an APHA value of 200 in a melting state. The waxy solid was designated as CAG-6.

EXAMPLE 12

Preparation No. 7 of a Compound Having Amino Groups

The same procedures were followed as in Example 6, except that 950 parts of PE-2 and 50 parts of SP018 were employed to obtain a waxy solid having an amino value of 55 mgKOH/g and an APHA value of 180 in a melting state. The waxy solid was designated as CAG-7.

EXAMPLE 13

Preparation No. 8 of a Compound Having Amino Groups

The same procedures were followed as in Example 6, except that 900 parts of PE-4 and 100 parts of SP018 were employed to obtain a waxy solid having an amino value of 100 mgKOH/g and an APHA value of 150 in a melting state. The waxy solid was designated as CAG-8.

EXAMPLE 14

Preparation No. 9 of a Compound Having Amino Groups

The same procedures were followed as in Example 6, except that 900 parts of PE-5 and 100 parts of SP200 were employed to obtain a viscous liquid having an amino value of 102 mgKOH/g and an APHA value of 120 in a melting state. The viscous liquid was designated as CAG-9.

EXAMPLE 15

Preparation No. 10 of a Compound Having Amino Groups

The same procedures were followed as in Example 6, except that 900 parts of PE-6 and 100 parts of SP018 were employed to obtain a viscous liquid having an amino value of 104 mgKOH/g and an APHA value of 180 in a melting state. The viscous liquid was designated as CAG-10.

EXAMPLE 16

Preparation No. 11 of a Compound Having Amino Groups

The same procedures were followed as in Example 6, except that 900 parts of PE-7 and 100 parts of SP200 were employed to obtain a waxy solid having an amino value of 99 mgKOH/g and an APHA value of 250 in a melting state. The waxy solid was designated as CAG-11.

EXAMPLE 17

Preparation No. 12 of a Compound Having Amino Groups

The same procedures were followed as in Example 6, except that 950 parts of PE-4 was employed and 200 parts of xylene was charged to dissolve, followed by heating at 40° C., and then 50 parts of SP200 was charged to obtain a reaction product.

200 g of tetrahydrofran was charged into the reaction product while sufficiently stirring to dissolve. Successively, 90 parts of dimethyl sulfate was charged and sufficiently mixed, followed by heating at 60° C. while stirring for 2 hours.

Subsequently, xylene employed in the reaction was removed at 80° C. under reduced pressures to obtain a solid product. The solid product was designated as CAG-12.

COMPARATIVE EXAMPLE 3

Preparation No. 1 of a Polyester Compound Having Amide Units

A 3-liter glass-made reaction flask equipped with an agitator, a condenser, thermometer, and a tube for blowing nitrogen was charged with 116 parts of caproic acid, 2000 parts of epsilon-caprolactone, and 2 parts of tetrabutyl titanate, followed by heating at 185° C. for 18 hours while streaming nitrogen gas to allow to react to obtain a polyester compound.

A 2-liter glass-made reaction flask equipped with an agitator, a condenser, thermometer, a tube for removing water, and a tube for blowing nitrogen was charged with 1000 parts of the above-described polyester compound. Successively, there were charged 100 parts of a polyethyleneimine having a molecular weight of 10,000 (SP200, manufactured by Nihon Shokubai Kagaku Co. Ltd.) and 600 cm$^3$ of toluene as a solvent for removing water to allow to react while stirring at 150° C.

Reaction was terminated at the period that 14 cm$^3$ of water was removed to obtain a toluene solution product.

Amino value of the product after removing toluene was 70 mgKOH/g. APHA value in a melting state was 500.

Furthermore, absorption peaks by amide bonds were observed at 1650 cm$^{-1}$ and 1550 cm$^{-1}$ in IR spectra, whereby, it was identified that a polyester chain is grafted to polyethyleneimine through amide bond. The product was designated as CAG-13.

APPLICATION EXAMPLE 1

Fluidity Test No. 1

In an apparatus (manufactured by Reddevil, Ltd.) for dispersing, there were mixed 75 parts of titanium oxide (Typehk CR95:C.I-Pigment White 6 manufactured by Ishihara Sangyo), 1 part of the compound having amino group obtained in Example 6, 7 parts of xylene, 7 parts of butylcellosolve acetate, and 100 parts of glass beads for 60 minutes to obtain a dispersed paste.

The dispersed paste exhibited a good fluidity at even after 1 week.

APPLICATION EXAMPLES 2–22

Fluidity Test Nos. 2–22

In the same apparatus as in Application Example 1, there were mixed respective pigments, the compounds having amino group contained in Examples 6–17, xylene, butylcellosolve acetate, and 100 parts of glass beads for 60 minutes to obtain respective dispersed pastes, based on respective mixing ratio as described in Table 1. The dispersed pastes exhibited a good fluidity at even after 1 week.

TABLE 1

| | Pigment | Compound having amino group | Solvent |
|---|---|---|---|
| Application Example 2 | A (20) | CAG-1 (4) | Xylene (38)/BCA (38) |
| 3 | B (25) | CAG-1 (10) | Xylene (32.5)/BCA (32.5) |
| 4 | C (75) | CAG-2 (1) | Xylene (7)/BCA (7) |
| 5 | A (20) | CAG-2 (4) | Xylene (23)/BCA (23) |
| 6 | B (25) | CAG-2 (10) | Xylene (32.5)/BCA (32.5) |
| 7 | C (75) | CAG-3 (1) | Xylene (7)/BCA (7) |
| 8 | A (20) | CAG-3 (4) | Xylene (23)/BCA (23) |
| 9 | B (25) | CAG-3 (10) | Xylene (32.5)/BCA (32.5) |
| 10 | D (25) | CAG-7 (10) | Xylene (65) |
| 11 | E (45) | CAG-8 (5) | Xylene (50) |
| 12 | F (60) | CAG-9 (2) | Xylene (38) |
| 13 | G (70) | CAG-10 (2) | Xylene (14)/BCA (14) |
| 14 | H (40) | CAG-2 (2) | MIBK (29)/BCA (29) |
| 15 | I (45) | CAG-2 (2.5) | Xylene (52.75) |

TABLE 1-continued

| | Pigment | Compound having amino group | Solvent |
|---|---|---|---|
| 16 | J (40) | CAG-4 (2) | Xylene (5) |
| 17 | K (20) | CAG-5 (10) | Xylene (70) |
| 18 | K (20) | CAG-6 (10) | Xylene (70) |
| 19 | K (20) | CAG-9 (10) | Xylene (70) |
| 20 | L (45) | CAG-3 (3) | Xylene (52) |
| 21 | K (20) | CAG-7 (10) | Xylene (70) |
| 22 | I (45) | CAG-12 (2) | Xylene (53.25) |

In the Table 1, numerical values in parenthesis represent parts by weight of respective components, and alphabetical indications or abbreviations are as follows.

A: Carbon black (MA-100:C.I-Pigment Black 7 manufactured by Mitsubishi Kasei Co.)

B: Phthalocyanineblue (Chlomofineblue 4920:C.I-Pigment Blue 15:3 manufactured by Dainichi Seika Kogyo)

C: Titanium oxide (Typehk CR95:C.I-Pigment White 6 manufactured by Ishihara Sangyo)

D: Phthalocyanineblue (Chlomofineblue 5310:C.I-Pigment Green 7 manufactured by Dainichi Seika Kogyo)

E: Benzimidazolone Yellow (Chlomofineyellow 2080:C.I-Pigment Yellow 154 manufactured by Dainichi Seika Kogyo)

F: Yellow iron oxide (Mapicoyellow LLXLO: C.I-Pigment Yellow 42 manufactured by Titanium Kogyo)

G: Red iron oxide (C.I-Pigment Red 101)

H: Quinacridone (Chlomofine red 6820:C.I-Pigment Violet 19 manufactured by Dainichi Seika Kogyo)

I: Brilliant Carmin 6B (Simler Brilliant Carmin 6B 236:C.I-Pigment Red 57:1 manufactured by Dainippon Ink Kagaku Kogyo)

J: Disazoyellow (Seikafastyellow 2300:C.I-Pigment Yellow 12 manufactured by Dainichi Seika Kogyo)

K: Carbon black (Degussa FW-200:C. I-Pigment Black 7)

L: Diketopyrrolopyrrole (Ciba Geigy DPP Red BO:C.I-Pigment Red 254)

BCA: Butylcellosolve acetate

MIBK: Methylisobutylketone

COMPARATIVE APPLICATION EXAMPLE 1

Fluidity Test No. 23

In an apparatus (manufactured by Reddevil, Ltd.) for dispersing, there were mixed 20 parts of carbon black (Degussa FW-200:C.I-Pigment Black 7), 10 parts of CAG-13, 70 parts of xylene, and 100 parts of glass beads for 60 minutes to obtain a dispersed paste. The dispersed paste exhibited fluidity immediately after dispersion. However, it exhibited a jelly state after 1 week, and did not exhibit fluidity.

COMPARATIVE APPLICATION EXAMPLE 2

Fluidity Test No. 24

In an apparatus (manufactured by Reddevil, Ltd.) for dispersing, there were mixed 20 parts of carbon black (Degussa FW-200:C.I-Pigment Black 7), 12.5 parts of an alkyd resin (Bekkozole EZ-3530-80 manufactured by Dainihon Ink Ltd. which has nonvolatile components of 80% in xylene), 67.5 parts of xylene, and 100 parts of glass beads for 60 minutes to obtain a dispersed paste. The dispersed paste exhibited a jelly state, and did not exhibit fluidity at all.

APPLICATION EXAMPLES 35, 36 AND COMPARATIVE APPLICATION EXAMPLE 3

Evaluation of coating layers was carried out using compositions in which pastes prepared in the Fluidity test Nos. 3, 19, and 23 were mixed with components as shown in Table 2 to obtain respective coating compositions.

The respective coating compositions were coated immediately after prepared and after placed at 0° C. for 3 days, and coating layers were baked at conditions of 135° C. and 30 minutes to evaluate the gloss of surface (at the angle of 60 degree).

Results are shown in Table 3.

TABLE 2

| Components | Mixing Ratio (%) |
|---|---|
| Millbase composition (a mixture composed of a pigment and a compound having amino groups) | 12.6 |
| Alkyd resin | 52.2 |
| Melamine resin | 10.4 |
| Xylene | 24.0 |
| Catalyst for curing | 0.8 |

As the alkyd resin, there was employed Bekkozole EZ-3530-80 manufactured by Dainihon Ink, Ltd.

As the melamine resin, there was employed a methylated melamine resin manufactured by Mitsui Toatsu Kagaku, Ltd.

As the catalyst for curing, there was employed a curing accelerator manufactured by Mitsui Toatsu Kagaku, Ltd.

TABLE 3

| | Gloss immediately after mixing | Gloss after 3 days after mixing |
|---|---|---|
| Application Example 35 | 94 | 90 |
| Application Example 36 | 95 | 95 |
| Comparative Application Example 3 | 90 | 81 |

While the invention has been described in detail and with reference to specific embodiments thereof, it will be apparent to one skilled in the art that various changes and modifications can be made therein without departing from the spirit and scope thereof.

What is claimed is:

1. A polylactone having amino groups represented by General Formula (1)

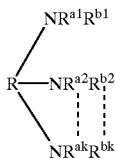

(1)

wherein R is a residual group of an aliphatic, alicyclic, and aromatic hydrocarbon, the atom N may form a ring together with said R which may have a substituent group, at least one of $R^{a1}, R^{a2}, \ldots R^{ak}, R^{b1}, R^{b2}, \ldots R^{bk}$ are a substituent group represented by General Formula (2)

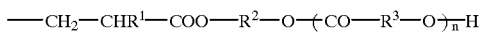

wherein $R^1$ is a hydrogen or methyl group, $R^2$ is a residual group of an aliphatic or aromatic hydrocarbon having a carbon number ranging from 1 to 10, polypropyleneoxy units or polyethyleneoxy units which may have substituent groups, $R^3$ is an alkylene unit having a carbon number ranging from 3 to 10 which may have side chains having a carbon number ranging from 1 to 5, n pieces of $R^3$ may be identical or different from each other, n is a number ranging from 1 to 100 on an average, and other $R^{a1}, R^{a2}, \ldots R^{ak}, R^{b1}, R^{b2}, \ldots R^{bk}$ are independently a hydrogen or an alkyl group having a carbon number ranging from 1 to 10, k is an integer ranging from 1 to 5.

2. A polylactone having amino groups as set forth in claim 1, wherein said polylactone is derived from at least one selected from the group consisting of epsilon-caprolactone, methylcaprolactone, methylcaprolactone, delta-valerolactone, and beta-methyl-delta-valerolactone.

3. A polylactone having amino groups as set forth in claim 1, wherein said amino groups are derived from piperazine or a piperazine derivative having at least two primary or secondary amino groups.

4. A process for the preparation of a polylactone having amino groups as set forth in claim 1 which comprises a Michaels addition reaction of a polylactone having (meth) acrylic group represented by General Formula (3)

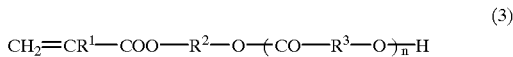

wherein $R^1$ is a hydrogen or methyl group, $R^2$ is a residual group of an aliphatic, alicyclic, or aromatic hydrocarbon having a carbon number ranging from 1 to 10, polypropyleneoxy units or polyethyleneoxy units which may have substituent groups, $R^3$ is an alkylene group having a carbon number ranging from 3 to 10 which may have side chains having a carbon number 1 to 5, n pieces of $R^3$ may be identical or different from each other, n is a number of 1 to 100 on an average, with an amine having a primary amino group or secondary amino group.

5. A process for the preparation of a polylactone having amino groups as set forth in claim 4, wherein said amine is at least one selected from the group consisting of piperazine, 1,4-bis(aminopropyl)piperazine, 2-methylpiperidine, and N,N'-dimethylethylenediamine.

* * * * *